Aug. 26, 1969  G. K. MOELLER  3,464,028
10.6 MICRON CARBON DIOXIDE LASER WITH HELIUM ADDED
Filed Nov. 15, 1965
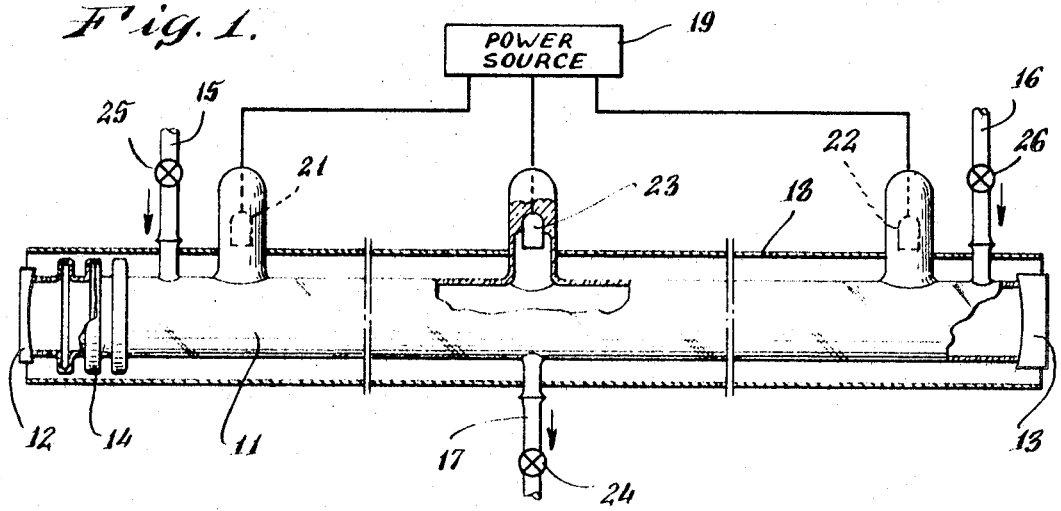
Fig. 1.
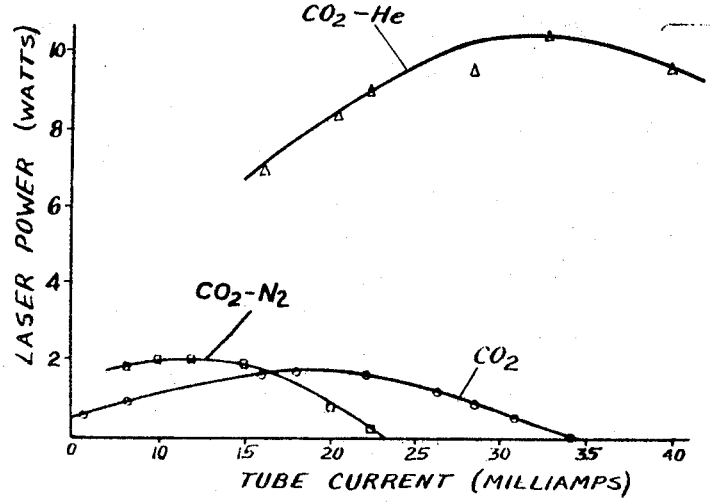
Fig. 3.
| PARTIAL PRESSURE (TORR) | | |
|---|---|---|
| $CO_2$ | $N_2$ | He |
| 2.2 | — | — |
| 2.4 | 1.1 | — |
| 2.2 | — | 19.2 |
LASER POWER PRODUCED BY OPTIMUM
MIXTURES OF FLOWING GASES
| PARTIAL PRESSURE (TORR) | | | LASER POWER (WATTS) | EFFICIENCY |
|---|---|---|---|---|
| $CO_2$ | He | $N_2$ | | |
| 0.6 | — | 3.6 | 4.5 | 2.9 |
| 1.3 | 11.5 | (.004)[a] | 5.25 | 1.5 |
| 2.7 | 7.8 | 3.5 | 18.0 | 4 |
| 1 | — | (.003)[a] | 0.41 | |
[a] IMPURITY LEVEL
Fig. 2.
INVENTOR.
Guido K. Moeller
BY
Irving M. Kriegsman
ATTORNEY.

United States Patent Office 3,464,028
Patented Aug. 26, 1969

3,464,028
10.6 MICRON CARBON DIOXIDE LASER WITH HELIUM ADDED
Guido K. Moeller, Norwalk, Conn., assignor to The Perkin-Elmer Corporation, Norwalk, Conn., a corporation of New York
Filed Nov. 15, 1965, Ser. No. 507,756
Int. Cl. H01s 3/22
U.S. Cl. 331—94.5        3 Claims

ABSTRACT OF THE DISCLOSURE

An optical maser for producing a beam of coherent radiation in the infrared wavelength region in which the active material is a mixture of carbon dioxide and helium.

---

The present invention is related to lasers. More particularly, the present invention is related to lasers of the type employing a molecular gas as the active medium.

The recent discovery of the optical maser has made possible the generation and amplification of coherent electro-magnetic waves in the optical frequency range.

Generally speaking, the operation of a laser depends on the population inversion of certain energy levels within a system. With lasers employing a monatomic gas as an active medium, notably the He-Ne and argon lasers, the energy levels are those of the electronic state. When a monatomic molecule like neon, for example, is in the lowest electronic state, it is considered to be unexcited and therefore passive. A polyatomic molecule, however, even when in the electronic ground state, still has mechanisms which store energy and it may still be exicted, although the energies are not normally as large as those connected with electronic excitation. There are two such fundamental mechanisms, namely vibration and rotation.

In the simplest model, the molecule is considered held together by springs executing vibration according to some periodic law of motion. In addition, it may rotate about its center of mass. Molecular systems can exist only with certain well defined energies and so, in complete analogy with the "orbits" of electrons, there are discrete states of vibration and rotation and associated with these are discrete energy levels.

Just as in electronic states, these energy levels normally are less populated the higher their energy, and in order to obtain laser actoin, this condition must be reversed, that is, the levels or perhaps better, the population of the levels must be (at least temporarily) inverted so that a net migration from upper to lower levels will result, with the accompaning release of radiant energy. As in other lasers, this can be achieved in several ways.

This invention is concerned with a molecule type laser, that is a laser employing a molecular gas or, for example, one employing carbon dioxide as the working gas.

Carbon dioxide is a linear triatomic molecule with configuration O-C-O. For such a system there are three so called normal modes of vibration. The primary laser transition is seen to be that originating at level 001 and terminating at level 100. For the laser action to occur, some of the levels of the state 001 and 100 must be inverted relative to one another, i.e., the number of atoms in some level of state 001 must exceed that of some level in state 100 in a given volume of gas. It happens that the excitation of $CO_2$ at pressures of a few mm. Hg by electronic discharge and consequent ionization and cascading effects results in just such inversion and $CO_2$ will "lase" by itself. In a letter authored by C. K. N. Patel and published in the Applied Physics Letters July 15, 1965 high power CW laser action was reported in the P-branch rotational transitions of the $00^01$–$10^00$ vibrational bands of $CO_2$ at wavelengths near 10 microns. The mechanism proposed was collisions of the second kind between ground state $CO_2$ molecules and excited $N_2$ molecules.

It is therefore an object of the present invention to provide a laser having a high-power output.

It is another object of the present invention to increase the power output of a laser of the type employing a molecular gas as the working medium.

It is another object of the present invention to provide a new mixture of gases for use in a continious wave laser having high output, which employs a gas as the working medium and is operable in either a flowing or non-flowing condition.

Other objects and many attendant advantages of the present invention will be readily apparent and more easily understood by the following detailed description taken in conjunction with the drawings wherein:

FIGURE 1 is a simplified schematic representation of an embodiment of the present invention;
FIGURE 2 is a chart showing various power outputs for a flowing system; and
FIGURE 3 is a graph and chart showing power outputs of various gas combinations.

The above and other objects of the invention are achieved by means of providing for a new and novel laser in which an inert gas such as helium is added to a molecular type working gas. The laser is operable in either a flowing or non-flowing condition.

Referring now to FIGURE 1 there is shown a simplified schematic representation of a laser of the present invention which includes a chamber in the form of a Pyrex tubular member 11 having a discharge length of 96 cm. and a bore of 21 mm. The tubular member 11 is further provided with a pair of spaced apart reflective members in the form of internal mirrors 12 and 13. Mirror 13 includes a glass substrate coated with gold and an 88% reflective dielectric coating on "Irtran II," an infrared transmitting material comprising zinc sulfide. Both mirrors 12 and 13 have a three meter concave radius. Tubular member 11 is further provided with means in the form of a glass bellows 14 for making small adjustments of the position of mirror 12.

Suitable gas inlets 15 and 16 are located near each end of the tubular member 11. The tubular member 11 is further provided with an outlet 17 adapted to be connected to a 5 cu. ft. per minute force pump (not shown). To keep the wall of the tubular member 11 at a desired temperature for optimum laser action the tubular member is provided with cooling means in the form of a sleeve 18 into which is forced air. Means are also provided for exciting the laser material. In the embodiment shown, a DC excitation is employed; however AC or RF excitation may also be used. Accordingly a pair of electrodes 21 and 22 is suitably located at each end of the laser tube 11 and an electrode 23 is disposed at a mid point. Electrodes 21, 22 and 23 are connected to a suitable source of power 19. Valves 24, 25 and 26 permit the operation of the laser in either a flowing or non-flowing condition.

Disposed within the tubular member 11 is the negative temperature medium in the form of a mixture of gases. One of the gases is a "molecular" gas capable of lasing and another gas present is of the type classified as inert. The term "molecular" gas, as used herein, is intended to refer to a gas comprising two or more elements. Examples of molecular gases capable of "lasing" are $CO_2$ and $N_2O$. The inert gases include He, Ne, Ar, Kr, Xe and Rn. In addition, $N_2$ may also be present in the gaseous mixture.

By way of example, in one embodiment of the present invention the active gaseous medium disposed within the tubular member 11 comprises a mixture of carbon dioxide and helium. In another embodiment of the present invention the gaseous medium disposed within the tube 11 comprises of a mixture of carbon dioxide, nitrogen and helium.

The results obtained in an actual embodiment of the present invention that was built and tested under a flowing state condition are shown in FIGURE 2. Pressures shown in the table were measured with a McLeod gauge attached to the tube and readings were taken before and after the flow of each constituent in the optimized system was individually valved off. Although not shown in the table, when the tube was not cooled by forced air the temperature changed from 35° C. to about 110° C. and the power output dropped by 50%.

The results obtained with a non-flowing gas system are shown in FIGURE 3. It is noted that the addition of 20 torrs of helium increased the laser power five-fold. For each mixture the spectrum of the output was scanned and in most cases power was seen on the P (20)–P (26) line. The strongest line was usually P (22) at 10.61 microns.

It will be readily apparent to those skilled in the art that numerous variations and modifications may be made within the spirit and scope of the invention and thus it is not intended to limit the invention except as defined in the following claims.

What is claimed is:

1. An optical maser for producing coherent infrared radiation comprising:
   (a) a pair of spaced apart infrared radiation reflecting mirrors;
   (b) a chamber disposed between said mirrors;
   (c) a gaseous mixture comprising carbon dioxide, helium and nitrogen continuously flowing within said chamber, the partial pressures of the carbon dioxide, helium and nitrogen being 2.7 torrs, 7.8 torrs and 3.5 torrs respectively; and 2. In a 10.6 micron optical maser in which the active material comprises carbon dioxide, the improvement comprising a quantity of helium mixed together with said carbon dioxide for improving the power output and efficiency of the optical maser and wherein the carbon dioxide and helium are in a nonflowing state and wherein the partial pressure of the carbon dioxide is about 2.2 torr and the partial pressure of the helium is about 19.2 torr.

3. In a 10.6 micron optical maser in which the active material comprises carbon dioxide, the improvement comprising a quantity of helium and nitrogen mixed together with said carbon dioxide for improving the power output and efficiency of the optical maser and wherein the partial pressure of the carbon dioxide is about 2.7 torr, the partial pressure of the helium is about 7.8 torr and the partial pressure of the nitrogen is about 3.5 torr.

References Cited

UNITED STATES PATENTS 3,411,105  11/1968  Patel _____ 331—94.5
3,393,372  7/1968  Vickery et al. _____ 331—94.5

OTHER REFERENCES

Patel: "Continuous-Wave Laser Action on Vibrational-Rotational Transitions of $CO_2$," Physical Review, vol. 136, pp. A1187–93, November, 1964.

Patel: "CW High Power $N_2$–$CO_2$ Laser," Applied Physics Letters, vol. 7, pp. 15–17, July 1, 1965.

Patel et al.: "Optical Maser Action in C, N, O, S, and Br," Physical Review, vol. 133, pp. A1244–48, Mar. 2, 1964.

JEWELL H. PEDERSEN, Primary Examiner

E. BAUER, Assistant Examiner

U.S. Cl. X.R.

313—223